United States Patent
Lai et al.

(10) Patent No.: US 10,025,415 B2
(45) Date of Patent: Jul. 17, 2018

(54) TOUCH PANEL AND LIQUID CRYSTAL DISPLAY DEVICE

(71) Applicants: Xiamen Tianma Micro-Electronics Co., Ltd., Xiamen (CN); Tianma Micro-Electronics Co., Ltd., Shenzhen (CN)

(72) Inventors: Qingjun Lai, Xiamen (CN); Jing Li, Xiamen (CN)

(73) Assignees: Xiamen Tianma Micro-Electronics Co., Ltd., Xiamen (CN); Tianma Micro-Electronics Co., Ltd., Shenzhen (CN)

( * ) Notice: Subject to any disclaimer, the term of this patent is extended or adjusted under 35 U.S.C. 154(b) by 16 days.

(21) Appl. No.: 14/849,547

(22) Filed: Sep. 9, 2015

(65) Prior Publication Data
US 2016/0328073 A1 Nov. 10, 2016

(30) Foreign Application Priority Data

May 8, 2015 (CN) .......................... 2015 1 0232329

(51) Int. Cl.
*G06F 3/044* (2006.01)
*G06F 3/041* (2006.01)

(52) U.S. Cl.
CPC ............ *G06F 3/0416* (2013.01); *G06F 3/044* (2013.01); *G06F 3/0412* (2013.01); *G06F 2203/04107* (2013.01)

(58) Field of Classification Search
CPC ...... G06F 3/0416; G06F 3/0412; G06F 3/044; G06F 2203/04103; G09G 3/36; G09G 2300/0426
See application file for complete search history.

(56) References Cited

U.S. PATENT DOCUMENTS

| | | | |
|---|---|---|---|
| 2010/0079401 A1* | 4/2010 | Staton | G06F 3/044 345/174 |
| 2012/0062250 A1* | 3/2012 | Kuo | G06F 3/044 324/686 |
| 2013/0207911 A1 | 8/2013 | Barton et al. | |
| 2014/0210768 A1* | 7/2014 | Badaye | G06F 3/044 345/174 |
| 2014/0313159 A1* | 10/2014 | Wilson | G06F 3/044 345/174 |

(Continued)

FOREIGN PATENT DOCUMENTS

| CN | 103513479 A | 1/2014 |
|---|---|---|
| CN | 104133590 A | 11/2014 |

(Continued)

*Primary Examiner* — Amr Awad
*Assistant Examiner* — Maheen Javed
(74) *Attorney, Agent, or Firm* — Faegre Baker Daniels LLP

(57) ABSTRACT

A touch panel and a liquid crystal display device. The touch panel includes a plurality of touch electrodes and a plurality of conductive grids, with each of the plurality of touch electrodes being located inside one of the plurality of conductive grids; a plurality of touch electrodes are divided into at least two groups of touch electrodes, at least two conductive network units insulated from each other are formed by a plurality of conductive grids, and each conductive network unit corresponds to at least one group of touch electrodes.

18 Claims, 9 Drawing Sheets

(56) References Cited

U.S. PATENT DOCUMENTS

| | | | |
|---|---|---|---|
| 2014/0354301 A1* | 12/2014 | Trend | G06F 3/044 324/658 |
| 2015/0091842 A1* | 4/2015 | Shepelev | G06F 3/044 345/174 |
| 2016/0216799 A1* | 7/2016 | Yang | G06F 3/044 |

FOREIGN PATENT DOCUMENTS

| | | |
|---|---|---|
| CN | 104281327 A | 1/2015 |
| CN | 104330935 A | 2/2015 |
| CN | 104571763 A | 4/2015 |
| WO | 2015047801 A1 | 4/2015 |

\* cited by examiner

TOUCH PANEL AND LIQUID CRYSTAL DISPLAY DEVICE

CROSS-REFERENCE TO RELATED APPLICATION

This application claims priority to Chinese Application No. 201510232329.5, filed May 8, 2015, which is herein incorporated by reference in its entirety.

TECHNICAL FIELD

The present disclosure relates to the field of touch technologies and, in particular, to a touch panel and a liquid crystal display device.

BACKGROUND

In an existing touch sensing system, as shown in FIG. 1, touch electrodes 20 are arranged in a matrix, and each of the touch electrodes 20 is connected with a touch driving integrated circuit 50 through a touch signal line 40. In detecting a touch, all the touch electrodes 20 operate in the same way. During the touch detection, touch driving signals generated by the touch driving integrated circuit 50 are supplied to the touch electrodes 20 through the touch signal lines 40 so that a certain number of charges are accumulated on each of the touch electrodes 20, and then a change of the charges on the touch electrode 20 is detected by the touch driving integrated circuit 50 via the touch signal lines 40, so that it is possible to determine which touch electrode(s) 20 is touched and further locate the position of the touch. The touch driving signals and the change of the charges can each be represented as a pulse signal. As shown in FIG. 2, during the touch detection, the touch driving integrated circuit 50 transmits pulse signals to the touch electrodes 20 via the touch signal lines 40, and receives pulse signal from the touch electrodes 20 via these touch signal lines 40 to determine the position of the touch.

In order to reduce a capacitance between two adjacent touch electrodes 20, each touch electrode 20 is arranged in a conductive grid (i.e. a conductive lattice) 301, and all the conductive grids 301 constitute together a whole conductive network unit 30, that is, conductors are placed in space between the touch electrodes 20 arranged in the matrix, to reduce the coupling capacitance between adjacent touch electrodes 20, and hence increase the speed of the touch detection. The conductive network unit 30 is electrically connected to the touch driving integrated circuit 50 and applied with a constant voltage by the touch driving integrated circuit 50, where the constant voltage is used as a common voltage to sustain the stability of the picture displayed in a display phase.

However, the voltage of the conductive network unit 30 is unstable due to the coupling disturbance between the touch electrodes 20 and the conductive network unit 30, thus the luminance at areas corresponding to the touch electrodes 20 is different from that at areas corresponding to the conductive network unit 30 during the display phase, therefore, a shadow caused by the profile of the conductive network unit 30 is likely present in the displayed image, and the shadow is particularly significant in a flickering picture.

SUMMARY

Embodiments of the disclosure provide a touch panel and a liquid crystal display device. In the touch panel, each touch electrode is arranged inside a conductive grid, a plurality of touch electrodes are divided into at least two groups of touch electrodes, at least two conductive network units insulated from each other are formed by a plurality of conductive grids, and each conductive network unit corresponds to at least one group of touch electrodes, so that each group of touch electrodes and the corresponding conductive network unit will not be interfered with by other groups of touch electrodes and other conductive network units, and a difference between voltages applied to each group of touch electrodes and the corresponding conductive network unit is insignificant or even eliminated, thus the luminance difference between the area corresponding to the touch electrode and the area corresponding to the conductive network unit is eliminated when a picture is being displayed.

To achieve the design mentioned above, the disclosure describes technical solutions as follows:

In one example, a touch panel is employed, the touch panel includes a plurality of touch electrodes; and a plurality of conductive grids, with each of the plurality of conductive electrodes being located inside one of the plurality of conductive grids;

the plurality of touch electrodes are divided into at least two groups of touch electrodes, the plurality of conductive grids form at least two conductive network units insulated from each other, and each conductive network unit corresponds to at least one group of the touch electrodes.

In another example, a liquid crystal display device is employed, the liquid crystal display device includes a color filter substrate and a touch panel as mentioned above.

Advantages of the disclosure include that in the touch panel, each touch electrode is arranged inside a conductive grid, a plurality of touch electrodes are divided into at least two groups of touch electrodes, at least two conductive network units insulated from each other are formed by a plurality of conductive grids, and each conductive network unit corresponds to at least one group of touch electrodes, so that each group of touch electrodes and the corresponding conductive network unit will not be interfered with by other groups of touch electrodes and other conductive network units, and a difference between voltages applied to the each group of touch electrodes and the corresponding conductive network unit is insignificant or even eliminated. Thus the luminance difference between the area corresponding to the touch electrode and the area corresponding to the conductive network unit is eliminated when a picture is being displayed.

While multiple embodiments are disclosed, still other embodiments of the disclosure will become apparent to those skilled in the art from the following detailed description, which shows and describes illustrative embodiments of the disclosure. Accordingly, the drawings and detailed description are to be regarded as illustrative in nature and not restrictive.

BRIEF DESCRIPTION OF THE DRAWINGS

To illustrate the technical solutions of the disclosure, the drawings used for the description of the disclosure are briefly introduced below. Obviously, the drawings for the following description only show some embodiments of the disclosure, and other drawings may be obtained from the described drawings.

Figure 1:
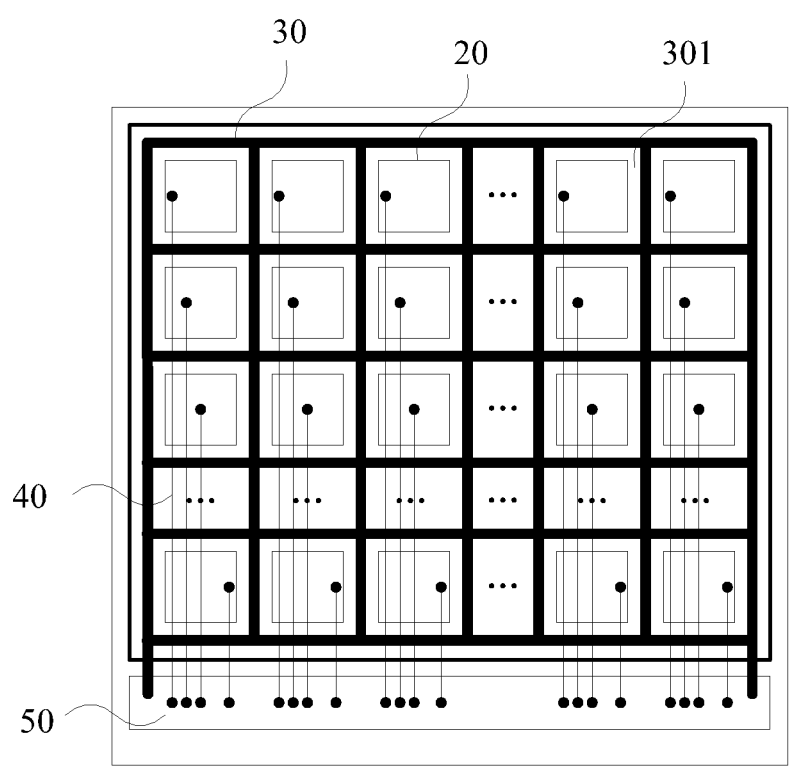
FIG. 1 is a schematic view showing a layout of touch electrodes and conductive grids in the related art.
Figure 2:
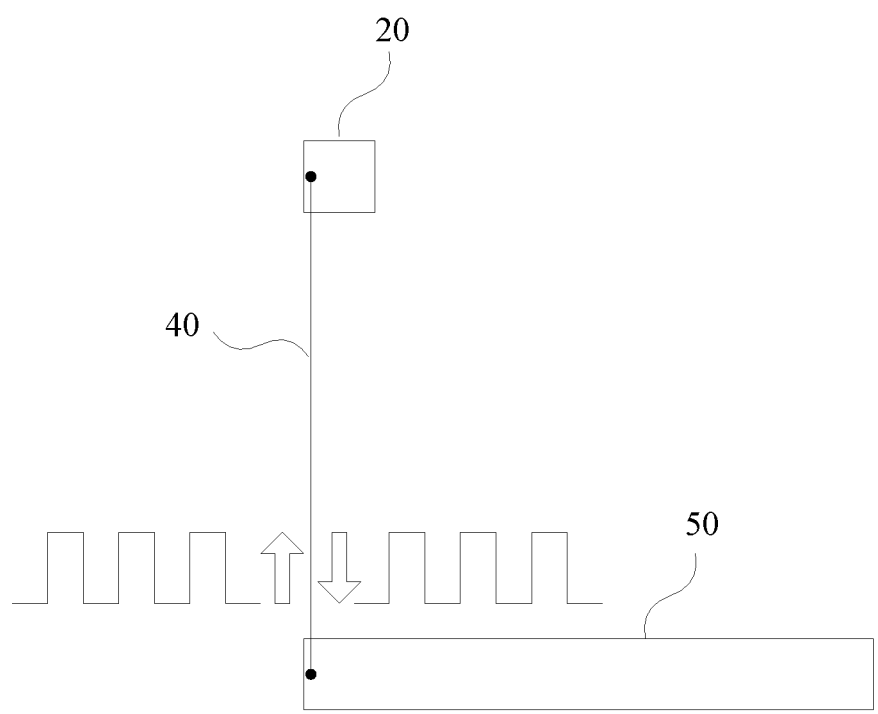
FIG. 2 is a schematic view showing transmission of signals between the touch electrode and the touch driving integrated circuit, shown in FIG. 1, during a self-capacitive touch detection.

While the disclosure is amenable to various modifications and alternative forms, embodiments have been shown by way of example in the drawings and are described in detail below. The intention, however, is not to limit the disclosure to the embodiments described. On the contrary, the disclosure is intended to cover all modifications, equivalents, and alternatives falling within the scope of the disclosure as defined by the appended claims.

DETAILED DESCRIPTION

The technical solutions in the disclosure are described below in combination with the drawings. Obviously, the described embodiments are some instead of all embodiments of the disclosure. All other embodiments obtained in light of the described embodiments fall within the protection scope of the disclosure.

Figure 3:
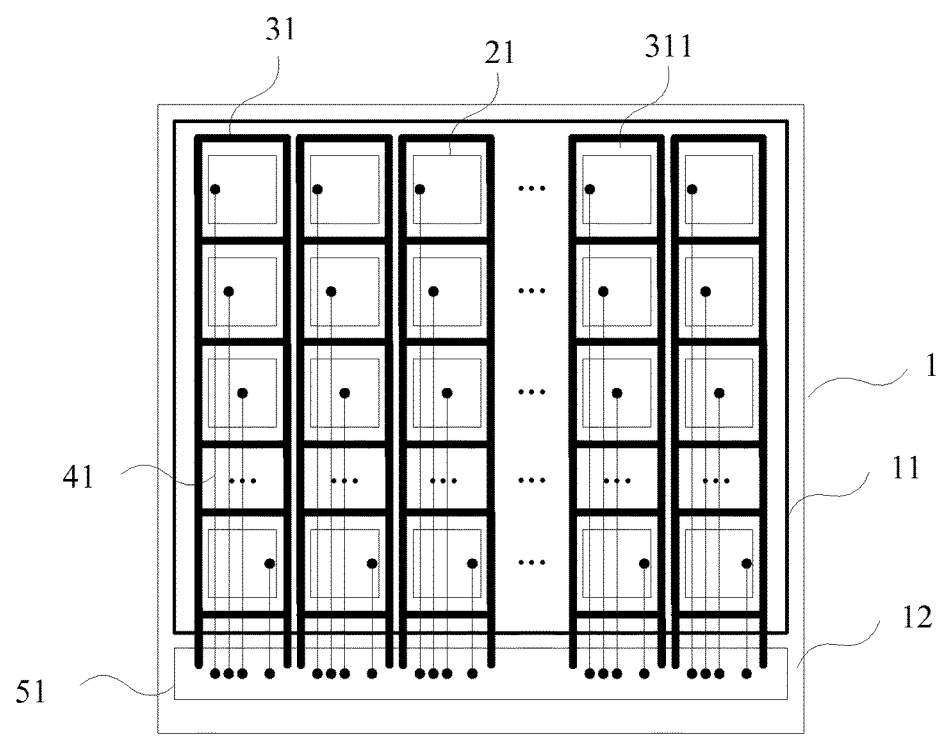
FIG. 3 is a schematic view showing a layout of touch electrodes and conductive grids of a touch panel, according to embodiments of the disclosure.

Referring to FIG. 3, which is a schematic view showing a layout of touch electrodes and conductive grids of a touch panel, according to embodiments of the disclosure, the touch panel includes a display region 11 and a non-display region 12, where a plurality of touch electrodes 21 and a plurality of conductive grids 311 are disposed in the display region 11, a touch driving integrated circuit 51 is disposed in the non-display region 12, and the plurality of touch electrodes 21 are electrically connected with ports of the touch driving integrated circuit 51 via touch signal lines 41. The plurality of touch electrodes 21 are located inside the plurality of conductive grids 311, respectively, the plurality of touch electrodes 21 are divided into at least two groups of touch electrodes, and the plurality of conductive grids 311 are divided into at least two conductive network units 31 insulated from each other.

Figure 4:
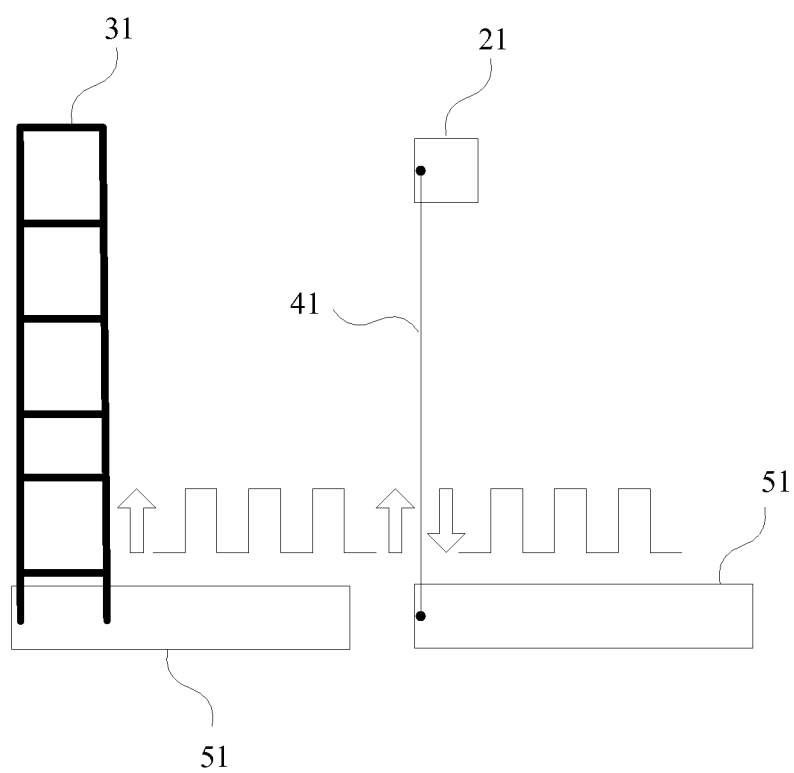
FIG. 4 is a schematic view showing transmission of signals in a touch panel during touch detection, according to embodiments of the disclosure.

Each conductive network unit grid 31 is constituted by at least two conductive grids 311 electrically connected in a mesh structure or a mesh-like structure, and is individually electrically connected to the port of the touch driving integrated circuit 51, as shown in FIGS. 3 and 4.

The touch electrodes are arranged in a matrix, and the touch driving integrated circuit 51 configured to drive the touch electrodes 21 for the purpose of touch detection is arranged at the bottom of the matrix. In the description below, such orientation of the touch driving integrated circuit 51 relative to the matrix is used as a reference for distinguishing rows and columns of the touch electrodes 21. For example, as shown in FIG. 3, each column of touch electrodes 21 form one group of touch electrodes, and each conductive network unit 31 corresponds to one group of touch electrodes, that is, each conductive network unit 31 is constituted by a column of conductive grids 311, with one touch electrode 21 being provided in each conductive grid 311. In embodiments, each row of touch electrodes 21 form one group of touch electrodes 21, and each conductive network unit 31 corresponds to one group of touch electrodes, that is, each conductive network unit 31 is constituted by a row of conductive grids 311, and one touch electrode 21 is provided in each conductive grid 311.

In embodiments, an individual constant voltage is applied to each conductive network 31.

Alternatively, each conductive network 31 is applied with a pulse signal identical to a touch detection pulse signal applied to a group of touch electrodes corresponding to the conductive network 31. An example of the pulse signal is shown in FIG. 4. It should be noted that the touch electrodes 21 are generally detected column by column for the touch detection, that is, the columns of the touch electrodes 21 may be respectively applied with different touch detection pulse signals, in this case, in order to further reduce a difference between a voltage applied to the touch electrode 21 and a voltage applied to the corresponding conductive grid 311, identical pulse signals are inputted to the group of touch electrodes 21 and the corresponding conductive network unit 31, so that these voltages applied to the group of touch electrodes 21 and the corresponding conductive network unit 31 vary synchronously from the very beginning. It should be noted that the touch driving integrated circuit 51 is shown in duplicate in FIG. 4, for ease of illustration that the pulse signals applied to the group of touch electrodes 21 and the corresponding conductive network unit 31 are identical.

Further, the conductive grids 311 may be grouped into conductive network units 31 in various manners. For example, each conductive network unit 31 can include a plurality of enclosed conductive grids 311 in addition to one row or column of conductive grids 311, and one conductive network unit 31 can correspond to a plurality of groups of touch electrodes.

In FIG. 3, a column of touch electrodes 21 form a group of touch electrodes 21, and a conductive network unit 31 envelops a group of touch electrodes 21. Of course, two adjacent conductive network units 31 shown in FIG. 3 can be combined into a larger conductive network unit enveloping two groups of touch electrodes, that is, the larger conductive network unit is composed of two columns of conductive grids 311, and corresponds to two groups of touch electrodes, i.e. two columns of touch electrodes 21.

In embodiments, individual constant voltages are applied to the respective conductive network units 31, and the conductive network units 31 are insulated from each other. As such, by applying the constant voltages to the conductive network units 31, the common voltage required for image displaying can be maintained during the touch detection, and at the same time, the constant voltages are individual so that the constant voltage applied to one of the conductive network units 31 will not affect other groups of touch electrodes via other conductive network units 31.

Alternatively, it is possible that each conductive grid in which one touch electrode is located individually forms a conductive network unit. That is, each conductive network unit is formed by one conductive grid, and a constant voltage is applied to the conductive network unit or a pulse signal identical to a touch detection pulse signal applied to the corresponding group of touch electrodes is applied to the conductive network unit.

Figure 5:
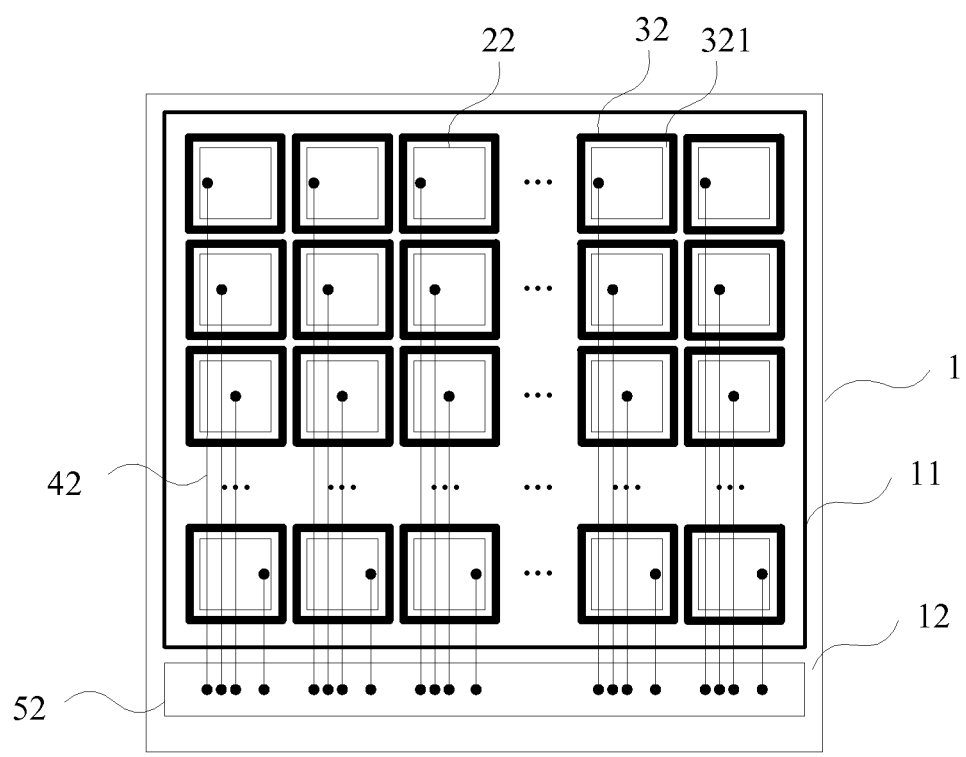
FIG. 5 is a schematic view showing another layout of the touch electrodes and conductive grids of the touch panel, according to embodiments of the disclosure.

As shown in FIG. 5, a touch panel includes a display region 11 and a non-display region 12, where a plurality of touch electrodes 22 and a plurality of conductive grids 321 are disposed in the display region 11, a touch driving integrated circuit 52 is disposed in the non-display region 12, and the plurality of touch electrodes 22 are electrically connected with ports of the touch driving integrated circuit 52 through touch signal lines 42. Each of the conductive grids 321 forms a conductive network unit 32. That is, if the number of touch electrodes 22 in the touch panel is m×n, then the number of the conductive network units is also m×n, accordingly, this arrangement will further reduce the disturbance between the conductive network units 32 and the touch electrodes 22. Each touch electrode 22 and the corresponding conductive network unit 32 operate individually.

Further, the touch driving integrated circuit 52 is configured to provide an individual constant voltage to each of the conductive network units 32, or provide each of the conductive network units 32 with a pulse signal identical to a touch detection pulse signal provided to the touch electrodes 32 corresponding to the conductive network unit 32. Especially, in the case that a pulse signal identical to a touch detection pulse signal provided to the corresponding touch electrodes 32 is individually provided to each conductive network unit 32, because the conductive network unit 32 is constituted by a single conductive grid 321 so that each conductive network unit 32 corresponds to one touch electrode 22, the probability that the constant voltage or the pulse signal applied to the conductive network unit 32 disturbs other conductive network units 32 and touch electrodes 22 is reduced at the maximum degree in terms of external disturbance; further, in terms of internal disturbance, because the identical pulse signals are provided to the conductive network unit 32 and the corresponding touch electrode 22, so that these voltages applied to the conductive network unit 32 and the corresponding touch electrode 22 vary synchronously from the very beginning, thereby eliminating the disturbance between the conductive network unit 32 and the touch electrodes 22.

In embodiments, it is further possible that each conductive network unit includes a plurality of conductive sub-grids each with a side opening, and each group of touch electrodes are enveloped by two conductive network units, where the side openings of one of the two conductive network units face those of the other of the conductive network units, so that each touch electrode in the group of touch electrodes is placed in a conductive grid formed by two conductive sub-grids with their side openings facing each other.

Figure 6:
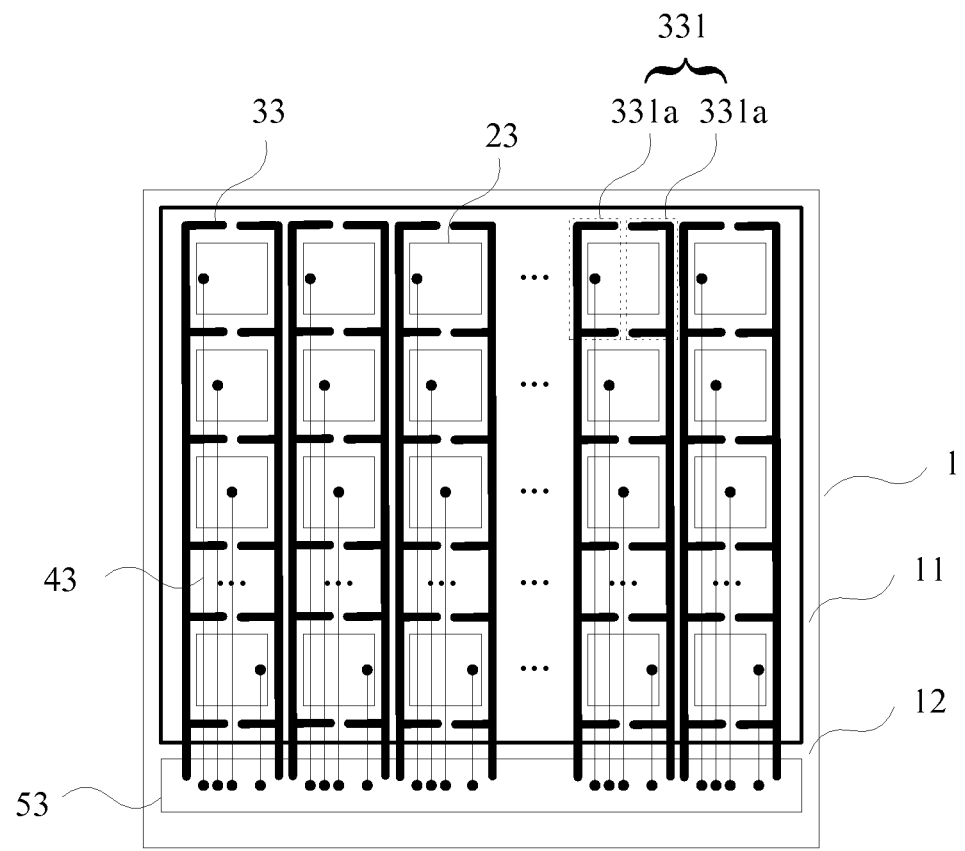
FIG. 6 is a schematic view showing still another layout of the touch electrodes and conductive grids of the touch panel, according to embodiments of the disclosure.

As shown in FIG. 6, a touch panel includes a display region 11 and a non-display region 12, where a plurality of touch electrodes 23 and a plurality of conductive network units 33 are disposed in the display region 11. A touch driving integrated circuit 53 is disposed in the non-display region 12, and the plurality of touch electrodes 23 are electrically connected with ports of the touch driving integrated circuit 53 through touch signal lines 43. Basic elements for constructing the conductive network unit 33 are conductive sub-grids 331a (each of which is represented by a half of the conductive grid 331), instead of the conductive grids 331, that is, each conductive network unit 33 is formed by a plurality of connected conductive sub-grids 331a, and includes side openings at the same side. Each group of touch electrodes are enveloped by two conductive network units 33, where the side openings of one of the two conductive network units 33 face those of the other of the conductive network units 33, but the two conductive network units 33 are not in electrical contact with each other.

Further, the touch driving integrated circuit 53 is configured to provide a constant voltage to each conductive network unit 33.

Due to the above design of the conductive sub-grids, the coupling capacitance between each conductive network unit 33 and the corresponding group of touch electrodes is reduced by a half, and hence the risk of the disturbance between the conductive network unit 33 and the corresponding group of touch electrodes is decreased.

Further, in a variant of the above, two adjacent conductive sub-grids with their side openings being opposite are configured to share a common side.

Figure 7:
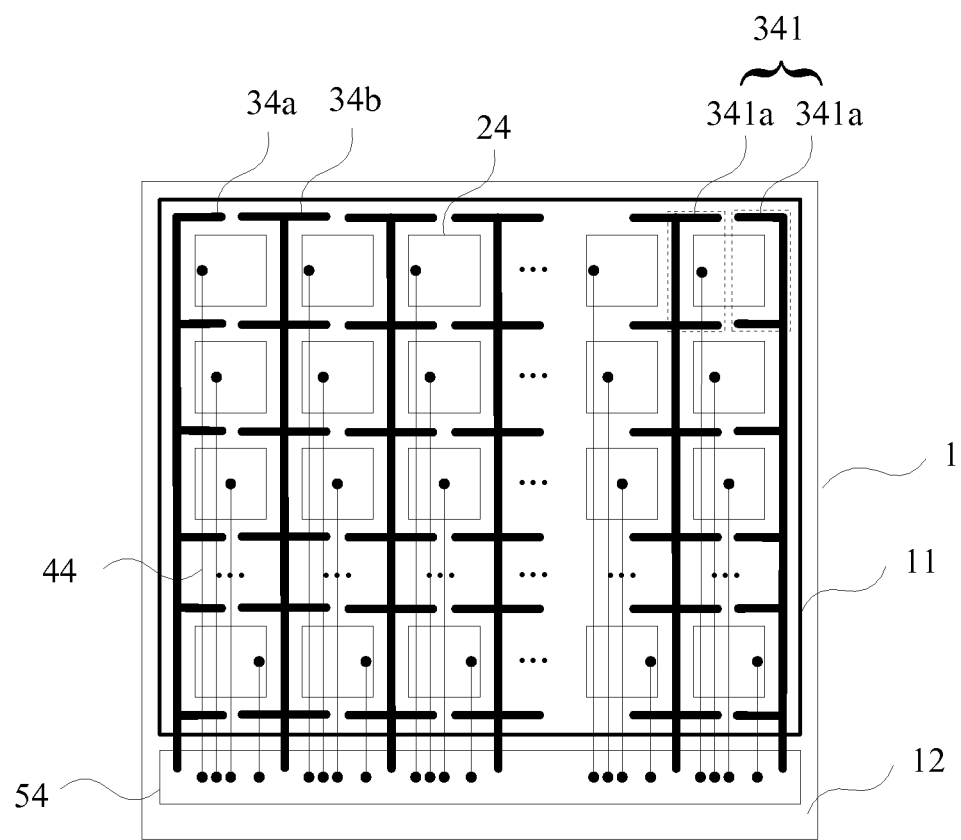
FIG. 7 is a schematic view showing further still another layout of the touch electrodes and conductive grids of the touch panel, according to embodiments of the disclosure.

As shown in FIG. 7, a touch panel includes a display region 11 and a non-display region 12, where a plurality of touch electrodes 24 and a plurality of conductive network units 34 are disposed in the display region 11, a touch driving integrated circuit 54 is disposed in the non-display region 12, and the plurality of touch electrodes 24 are electrically connected with ports of the touch driving integrated circuit 54 through touch signal lines 44. Each conductive network unit 34 is constructed by a plurality of connected conductive sub-grids 341a, and includes side openings at the same side. Specifically, two adjacent conductive sub-grids 341a with their side openings being opposite are configured to share a common side, thus forming an I-shaped structure, and a conductive network unit 34b is formed by a plurality of the I-shaped structures connected in sequence. Further, conductive sub-grids 341a, which are located at both lateral sides of the touch panel and do not have opposite openings, form two conductive network units 34a, each of which is constructed by one column of the conductive sub-grids 341a connected in sequence. As compared with the technical solution in FIG. 6, the technical solution in FIG. 7 has a simplified wiring structure.

Further, the touch driving integrated circuit 54 is configured to provide a constant voltage to each of the conductive network units 34a and each of the conductive network units 34b.

Due to the design of the conductive sub-grids, the coupling capacitance between each conductive network unit 34a or each conductive network unit 34b and the corresponding group of touch electrodes is reduced by a half, and hence the risk of the disturbance between the conductive network unit 33a or 34b and the corresponding group of touch electrodes is decreased.

Figure 8:
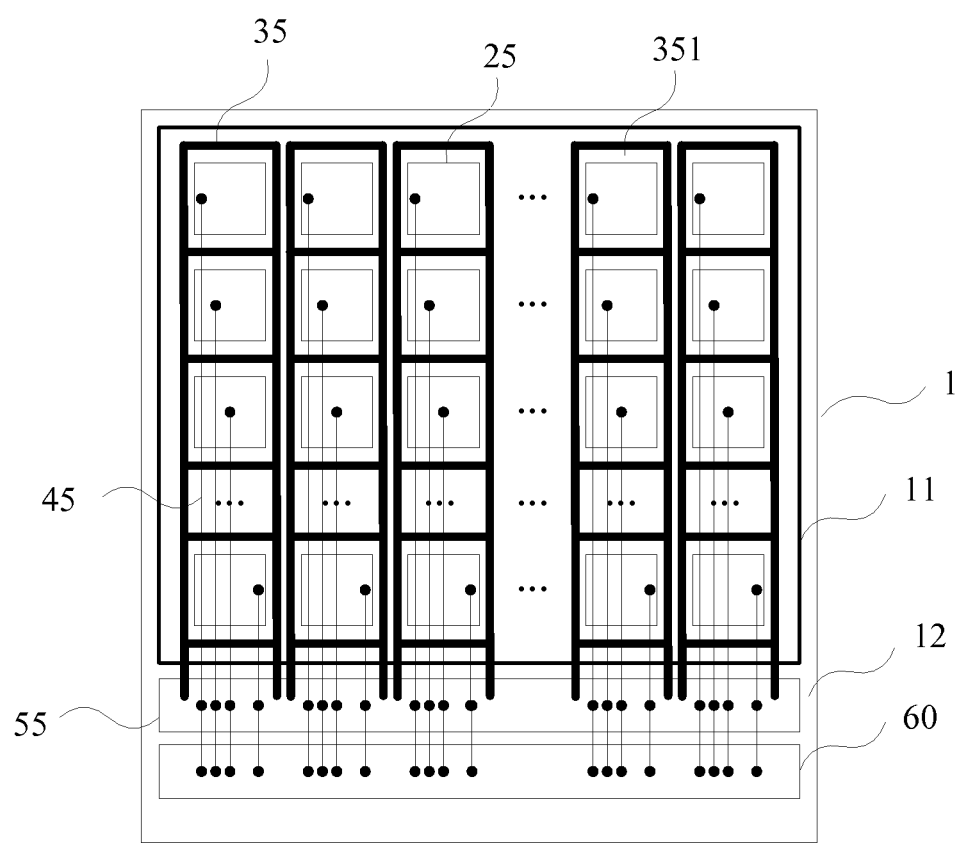
FIG. 8 is a schematic view showing the multiplexing of touch signal lines and display signal lines in a touch panel, according to embodiments of the disclosure.

As shown in FIG. 8, the touch panel of the disclosure further includes a plurality of touch signal lines 45, and each of the touch signal lines 45 is electrically connected with one of the touch electrodes 25, to transmit a touch detection signal.

In some embodiments, the touch electrodes 25 of the touch panel are divided from a common electrode for displaying, that is, in a display phase, a common voltage signal is provided to the touch electrodes 25 to achieve the display function of the touch panel; while in a touch phase, touch detection signals are provided to the touch electrodes 25 to achieve the touch sensing function of the touch panel.

Further, the touch signal lines 45 are multiplexed (reused) as display signal lines to the common electrode. As shown in FIG. 8, a touch driving integrated circuit 55 and a display driving integrated circuit 60 are both connected with the touch electrodes 25 through the touch signal lines 45. In this way, the touch electrodes 25 are driven by the touch driving integrated circuit 55 and the display driving integrated circuit 60 in a time division manner. In each operation cycle of the touch panel, the touch detection by the touch driving integrated circuit 55 alternates with the application of the common voltage by the display driving integrated circuit 60. The technical solution of dividing a common electrode into a plurality of touch electrodes has been disclosed in the related art, which is not further described herein.

As such, each touch electrode is arranged inside a conductive grid, a plurality of touch electrodes are divided into at least two groups of touch electrodes, at least two conductive network units insulated from each other are formed by a plurality of conductive grids, and each conductive network unit corresponds to at least one group of touch electrodes, so that each group of touch electrodes and the corresponding conductive network unit will not be interfered with by other groups of touch electrodes and other conductive network units, and a difference between voltages applied to the each group of touch electrodes and the corresponding conductive network unit is insignificant or even eliminated, thus the luminance difference between the area corresponding to the touch electrode and the area corresponding to the conductive network unit is eliminated when a picture is being displayed.

Embodiments of the disclosure further provide a liquid crystal display device, including: a color filter substrate 2 and a touch panel described in any of the above embodiments.

Integrated circuits of the liquid crystal display device (including a touch driving integrated circuit and a display driving integrated circuit) are arranged in a non-display region of the touch panel, and the touch signal lines and the conductive network units are electrically connected to the integrated circuits.

Figure 9:
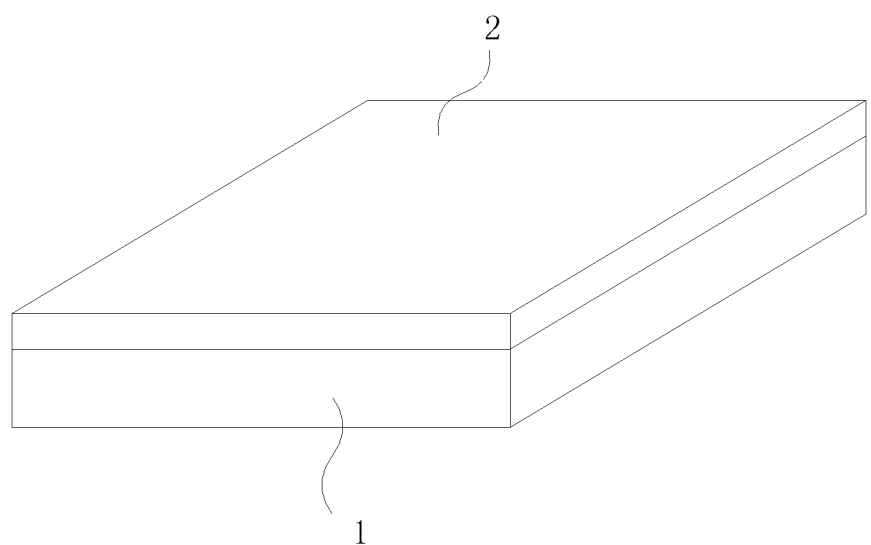
FIG. 9 is a structural view of a first example of a liquid crystal display device, according to embodiments of the disclosure.

Referring to FIGS. 8 and 9, the liquid crystal display device includes a color filter substrate 2 and a touch panel 1 mentioned above. The touch panel 1 includes a display region 11 and a non-display region 12, and a touch driving integrated circuit 55, a display driving integrated circuit 60 and other integrated circuits for auxiliary functions are disposed in the non-display region 12, where the non-display region 12 refers to a region of the touch panel 1 other than the display region 11.

Technical principles of the disclosure are described in combination with embodiments. These descriptions are for explaining the principles of the disclosure and are not regarded as limiting the scope of the disclosure. Based on the explanations herein, those skilled in the art can conceive other embodiments of the disclosure, and these embodiments shall also fall within the scope of the disclosure.

Various modifications and additions can be made to the exemplary embodiments discussed without departing from the scope of the disclosure. For example, while the embodiments described above refer to particular features, the scope of this disclosure also includes embodiments having different combinations of features and embodiments that do not include all of the described features. Accordingly, the scope of the disclosure is intended to embrace all such alternatives, modifications, and variations as fall within the scope of the claims, together with all equivalents thereof.

We claim:

1. A touch panel, comprising:
 a plurality of touch electrodes; and
 a plurality of conductive grids,
 wherein each of the plurality of conductive grids comprises a first conductive sub-grid and a second conductive sub-grid insulated from each other,
 the first conductive sub-grid comprises a first straight part extending in a first direction and a plurality of first branches protruding from the first straight part in a second direction that is orthogonal to the first direction,
 the second conductive sub-grid comprises a second straight part extending in the first direction and a plurality of second branches protruding from the second straight part in a third direction, wherein the third direction is opposite to the second direction, and
 each of the plurality of touch electrodes is incompletely encompassed collectively by the two adjacent first branches, the two adjacent second branches, the first straight part and the second straight part of a respective one of the plurality of conductive grids.

2. The touch panel of claim 1, further comprising a plurality of touch signal lines, which are electrically connected with the plurality of touch electrodes, respectively.

3. The touch panel of claim 2, wherein the plurality of touch electrodes are divided from a common electrode for displaying.

4. The touch panel of claim 3, wherein the plurality of touch signal lines are operable as display signal lines for the common electrode.

5. The touch panel of claim 1, wherein the plurality of touch electrodes are arranged in a matrix, and are divided into at least two groups, and each of the at least two groups comprises a row or column of the touch electrodes.

6. The touch panel of claim 1, wherein a constant voltage is applied to each of the plurality of conductive grids.

7. The touch panel of claim 1, wherein the plurality of touch electrodes are divided into at least two groups of touch electrodes, the plurality of conductive grids form at least two conductive network units insulated from each other, and each of the at least two conductive network units corresponds to at least one group of the touch electrodes, and wherein if one group of the touch electrodes are enveloped by one of the at least two conductive network units, a pulse signal identical to a touch detection pulse signal applied to the one group of the touch electrodes is applied to the one of the at least two conductive network units.

8. The touch panel of claim 1, wherein the plurality of touch electrodes are divided into at least two groups of touch electrodes, the plurality of conductive grids form at least two conductive network units insulated from each other, and each of the at least two conductive network units corresponds to at least one group of the touch electrodes, and wherein each conductive grid in which one touch electrode is located forms one of the at least two conductive network units, to which a constant voltage or a pulse signal identical to a touch detection pulse signal applied to the corresponding group of the touch electrodes is applied.

9. The touch panel of claim 1, wherein the second straight part of the second conductive sub-grid of a first one of the plurality of conductive grids coincides with the first straight part of the first conductive sub-grid of a second one of the the plurality of conductive grids.

10. A liquid crystal display device, comprising a color filter substrate and a touch panel, wherein the touch panel comprises:
 a plurality of touch electrodes; and
 a plurality of conductive grids,
 wherein each of the plurality of conductive grids comprises a first conductive sub-grid and a second conductive sub-grid insulated from each other, the first conductive sub-grid comprises a first straight part extending in a first direction and a plurality of first branches protruding from the first straight part in a second direction that is orthogonal to the first direction, the second conductive sub-grid comprises a second straight part extending in the first direction and a plurality of second branches protruding from the second straight part in a third direction, wherein the third direction is opposite to the second direction, and each of the plurality of touch electrodes is incompletely encompassed collectively by the two adjacent first branches, the two adjacent second branches, the first straight part and the second straight part of a respective one of the plurality of conductive grids.

11. The touch panel of claim 10, wherein in each of the plurality of conductive grids, the plurality of first branches and the plurality of second branches are in one-to-one correspondence.

12. The touch panel of claim 11, wherein each of the plurality of first branches and the corresponding one of the plurality of second branches are collinearly disposed.

13. The liquid crystal display device of claim 10, wherein integrated circuits of the liquid crystal display device are arranged in a non-display region of the touch panel, and touch signal lines and conductive network units are electrically coupled to the integrated circuits.

14. The touch panel of claim 10, wherein a length of each of the plurality of first branches is equal to that of each of the plurality of second branches.

15. The touch panel of claim 10, wherein the plurality of first branches are arranged at equal intervals, and the plurality of second branches are also arranged at equal intervals.

16. A touch panel, comprising:
a plurality of touch electrodes arranged in array; and
a plurality of conductive grids;

wherein each of the plurality of conductive grids comprises a first conductive sub-grid and a second conductive sub-grid insulated from each other, the first conductive sub-grid comprises a first straight part extending in a first direction and a plurality of first branches protruding from the first straight part in a second direction that is orthogonal to the first direction, the second conductive sub-grid comprises a second straight part extending in the first direction and a plurality of second branches protruding from the second straight part in a third direction, wherein the third direction is opposite to the second direction, each column of touch electrodes are located between the first conductive sub-grid and the second conductive sub-grid of a respective one of the plurality of conductive grids, and any two adjacent touch electrodes in the column are spaced by a respective one of the plurality of first branches and a respective one of the plurality of second branches each of the plurality of touch electrodes is incompletely encompassed collectively by the two adjacent first branches, the two adjacent second branches, the first straight part and the second straight part of a respective one of the plurality of conductive grids.

17. The touch panel of claim 16, wherein there is a gap between the respective one of the plurality of first branches and the respective one of the plurality of second branches.

18. The touch panel of claim 16, wherein the second straight part of the second conductive sub-grid of a first one of the plurality of conductive grids and the first straight part of the first conductive sub-grid of a second one of the the plurality of conductive grids are the same straight part.

* * * * *